(No Model.)　　　　　　　　　　　　　　　　2 Sheets—Sheet 1.
T. H. HICKS.
SYSTEM OF CONSTANT CURRENT GENERATION AND REGULATION.
No. 580,490.　　　　　　　　　　　Patented Apr. 13, 1897.
Fig. 1.
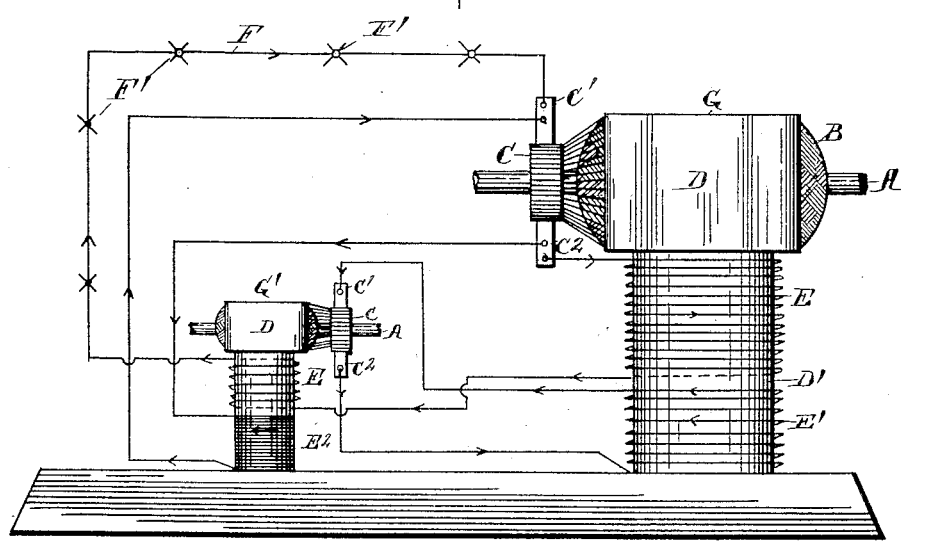
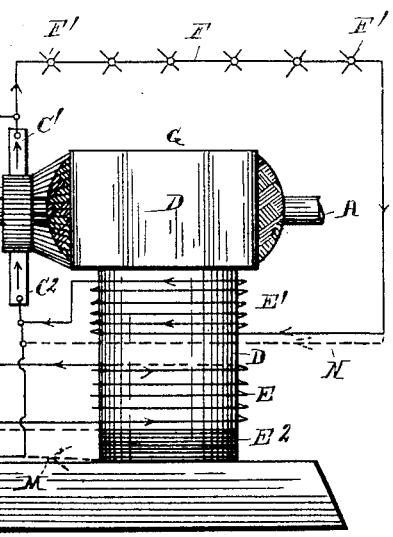
Fig. 2.
WITNESSES　　　　　　　　　　　　　INVENTOR
O. B. Baenziger.　　　　　　　　　Thomas H. Hicks
M. A. Martin.
　　　　　　　　　　By His Attorney
　　　　　　　　　　Newell S. Wright

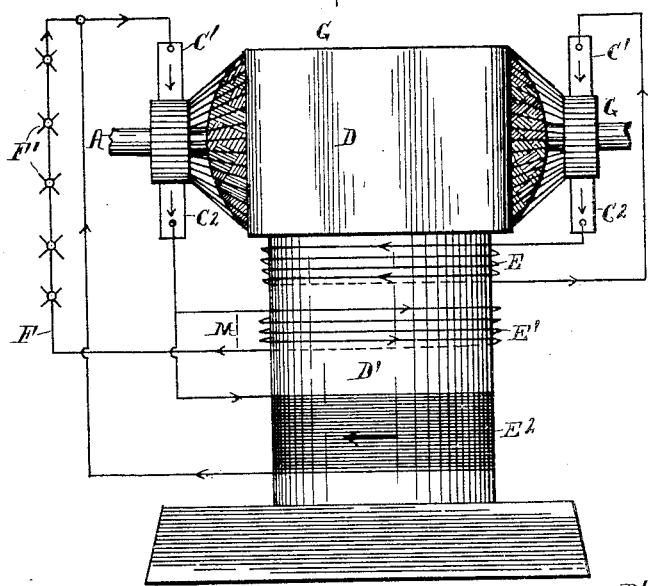
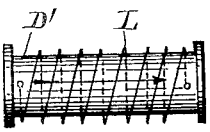
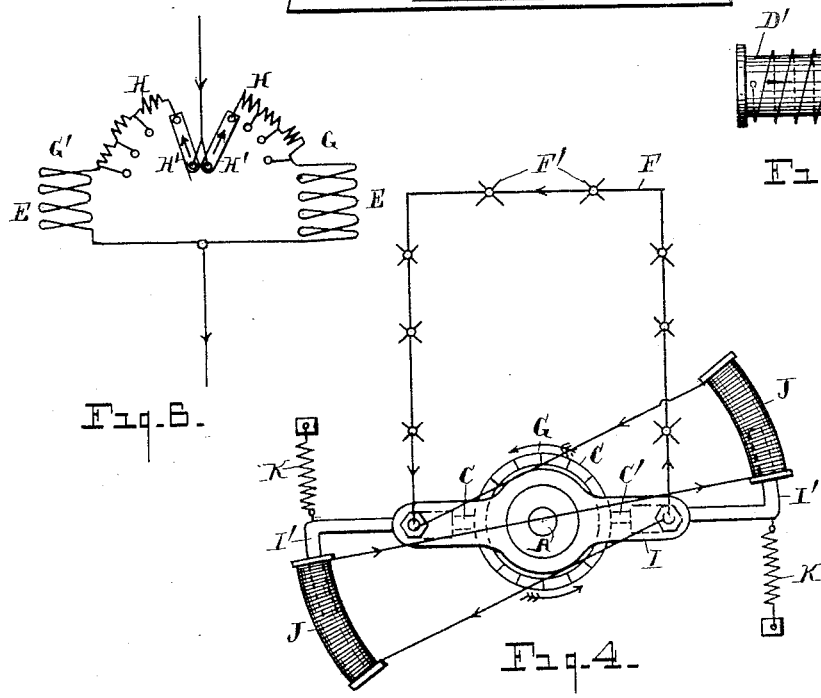

UNITED STATES PATENT OFFICE.

THOMAS H. HICKS, OF DETROIT, MICHIGAN.

SYSTEM OF CONSTANT-CURRENT GENERATION AND REGULATION.

SPECIFICATION forming part of Letters Patent No. 580,490, dated April 13, 1897.

Application filed November 5, 1894. Serial No. 527,852. (No model.)

*To all whom it may concern:*

Be it known that I, THOMAS H. HICKS, a subject of the Queen of Great Britain, residing at Detroit, county of Wayne, State of Michigan, have invented a certain new and useful Improvement in a System of Constant-Current Generation and Regulation; and I declare the following to be a full, clear, and exact description of the invention, such as will enable others skilled in the art to which it appertains to make and use the same, reference being had to the accompanying drawings, which form a part of this specification.

This invention relates to new and useful improvements in a system of "constant-current generation and regulation." My scheme embodies various modifications in the arrangement of parts, the modifications all coming within the spirit of my invention.

The following specification clearly elucidates the nature of my invention, including the modifications thereof, and the annexed drawings clearly illustrate the essential features described in the specification.

The drawings are partly diagrammatic and parts non-essential to the illustration of my invention being omitted; but still the drawings show enough to enable those skilled in the art to construct a machine including all of my improvements.

Figures 1, 2, and 3 are side elevations of three different modifications. Fig. 4 is a detailed plan of a brush-holder and its controlling device, which I use with either of the constructions shown in Figs. 1, 2, and 3. Fig. 5 is a plan of a magnet-discharger which may be applied in principle to either the field-magnets or the solenoid helix or core. Fig. 6 is a diagram view showing how the field-magnet coils E E of the two generators G G' may be connected together in multiple arc with a switch placed in either circuit for cutting in or out resistance to divert the right amount of current through either field-coil for the purpose of balancing the field-magnet strength of the two generators.

My scheme is best carried out in the construction I show in Fig. 1, which of course includes that portion I show in detail in Fig. 4. Therefore the constructions shown in Figs. 2 and 3 may properly be looked upon as modifications embracing the spirit of my invention.

It will not be necessary for me to describe each and every part shown in the drawings in detail, for the parts are all well known by representatives of this branch of the art. I will therefore just refer to the different parts by their name, each part being indicated by a different character, and afterward I will describe in detail my special combination and arrangement of the parts whereby new and improved results may be obtained.

Like letters of reference indicate similar parts.

A is a shaft. B is an armature. C is a commutator, and C' C² its brushes. D is a pole-piece of a field-magnet D'. E, E', and E² are field-magnet coils. F is a work-circuit having translating devices F' arranged therein in linear series. G is a generator for supplying the work-circuit with current. G' is a second regulating-generator. In Fig. 3, however, the two generators are combined in one. H in Fig. 2 is a resistance, and H' is a switch for cutting in or out resistance. I in Fig. 4 is a brush-arm having attached at either end a solenoid-core I', which operate in solenoid-helices J. K are counter-springs attached to the solenoid-cores. In Fig. 5 L is a special discharge-coil which may be applied to either the field-magnets or the solenoids.

Having thus referred to the various parts in a general way, I will now describe the manner of their arrangement and combination, together with their functions, whereby I am enabled to produce new and valuable results. In doing this I will describe the modification shown in each figure separately.

Starting first then with Fig. 1, the coils E of the generators G and G' are connected in linear series through the armature of the generator G and work-circuit F. The two generators, therefore, in this case are excited to primary action by the current which flows through the work-circuit. The armature of the regulating-generator G' is closed in its circuit through the coil E' of the work-circuit generator G, and the current is caused to flow through the coil E' in such a direction as to tend to neutralize the effect of the current which flows through E of generator G. This coil E' is therefore a differential coil. Of course, if the current flowing through coil E' were to entirely neutralize the effect of the current which flows through the coil E of the work-circuit generator G then the generator G would be inoperative. But the coils E and E' are so proportioned to each other and the electric pressure of the generator G' so regulated by speed and armature windings that the current which flows through the coil E of the generator G will, under all conditions, overpower the current of coil E' to such an extent that a predetermined excess of current will flow through its coil E sufficient for maintaining the desired volume of current for the work-circuit no matter what the resistance of the work-circuit may be, even to short-circuiting the brushes of the work-circuit generator. The construction thus far described controls the volume of current in such a manner only as to prevent the current of the work-circuit from exceeding the volume of predetermined strength.

My next improvement refers to a scheme for preventing the current of the work-circuit from decreasing in volume below its predetermined amount. This I accomplish by the coil $E^2$, which is connected in shunt from the brushes of the generator G, the current, of course, which flows through this coil $E^2$ always being proportional to the resistance and volume of current of the work-circuit. The coil $E^2$ is differentially wound to the coil E of the generator G'. Therefore when the ampere-turns of the two coils E and $E^2$ equal each other their generator G' will cease to send current through the differential coil E', and the current which flows through the coil E of the generator G will thereafter be unaffected by the coil E'. Therefore when the generator G is supplying its maximum load the generator G' is manifesting its minimum effects, and when the generator G is supplying its minimum load the generator G' is then doing its greatest work. The two machines, therefore, always operate conjointly, but still in a manner inversely to each other; but the proportional outputs of the two generators equal each other when the generator G is doing one-half of its capable work. It will be readily understood that inasmuch as the generator G' is excited to primary action by the current of the generator G any flow of current from G will instantaneously bring the generator G' into effective action, and the generator G' will therefore control the generator G as effectually as the series coil of a compound constant-potential generator will affect its work-circuit.

The functions of the coils E and E' of generator G and the coil $E^2$ of generator G' can be reversed and still be effective—that is to say, the coil $E^2$ could have the direction of its current reversed, so as to become supplemental to its fellow coil E, the coil E of generator G could have its current reversed, so as to become differential, and the coil E' coud be reversed, so as to become the primary exciting-coil of the generator G; but such changes would impair the efficiency of the machine, inasmuch as the current of the work-circuit would always be flowing through the coil E of the generator G, thereby lowering the field of force; but in the former case, as shown in Fig. 1, the current which flows through the coil E' diminishes as the load in the work-circuit increases. The proper proportional windings embodied in the four field-magnet coils (shown in Fig. 1) can be determined when the machine is constructed in the following manner: We will suppose the machine to be constructed suitable for one hundred arc-lamps having a current volume of ten amperes and the coils E E connected together in linear series, as shown in Fig. 1. The coil E would first be wound suitable for obtaining a field of force suitable for the total output of the one hundred lamps. Next the coil E' would be wound and connected in series with the coil E, but so as to produce differential effects and contain sufficient convolutions to reduce the voltage of the work-circuit for one lamp. The fall of potential would then be taken between the terminals of the coil E'. The generator G' would then be constructed so that a ten-ampere current flowing through its coil E would produce a pressure at its brushes equal to the fall of potential of the coil E', the speed of the armature of the generator G' being adjusted to produce the desired voltage. Next the number of watts consumed in the coil E of generator G' would be determined, and the coil $E^2$ would then be constructed so as to have a resistance capable of letting through just enough current when the full load of the one hundred lamps is on to equal in watts the number of watts consumed in the coil E of generator G'. The two generators being thus constructed will control each other, so as to maintain a current of constant volume in the work-circuit during all variations of load and that, too, with an accuracy that can never be equaled by mechanical devices which operate by fluctuations alone in the volume of current flowing through the work-circuit. This method for determining the proportional windings for the two machines is based upon the construction shown in Fig. 1, in which the coils E E of the two generators are joined together in linear series; but if the two coils be joined in multiple arc, as I illustrate in Fig. 6, then a switch H' and a resistance H would be interposed in the circuit of one of the coils for the purpose of either cutting in or out the resistance H. In this way the proportionate amounts of current required to flow through the two coils E E to balance the generating capacity of the two generators can be easily adjusted. The essentials of this feature of of my scheme (shown in Fig. 6) may be carried out in any of the constructions shown.

I have already mentioned how constant current may be maintained in the work-circuit by reversing the functions of the coils E, E', and E². I show such a construction in Fig. 2, except that the coil E of the generator G' is supplied with current from its own armature. In this case the regulating-generator becomes the primary exciter of the generator G. I also show in this figure how the coil E² may be applied to either generator, or both, coil E² of generator G being shown connected in shunt with the work-circuit by dotted lines, (marked M.) I also show in Fig. 2 a resistance H, being arranged in series with the coil E². This is quite essential in practice, as it affords an easy way for adjusting the flow of current in the coil E² to agree with the current flowing through coil E.

The coil E' in Fig. 2 may be dispensed with, as I show by the dotted line N, which cuts the coil out by short-circuiting its terminals through the conductor N; but the machine will respond to variations of load in the work-circuit more quickly if the differential coil E' be used.

The modification I show in Fig. 3 has the two armature-circuits rotatable in the same field of force. Otherwise this construction is very similar to Fig. 2. In either case the work-circuit-generator field-magnets are wound with coils E, E', and E², and the coil E' may be cut out in the construction shown in Fig. 3, as I have mentioned in the case of Fig. 2, (indicated by the dotted line N.) In all of the constructions the resistance H is intended to be used as shown in Fig. 2. Each and every circuit may be readily traced by reference to the arrow-heads located thereon.

Thus far I have shown how constant current may be maintained in the work-circuit; but there is another essential device which I require to use with all of the constructions shown, and that essential is an automatically-moving brush-holder which will change the location of the brushes whenever the load on the machine changes. Otherwise destructive sparking is apt to occur between the brushes and commutator.

The device for automatically operating the brush-holder I show in Fig. 4, which is constructed and operated as follows: At either one or both ends of the brush-arm I, I secure thereto a solenoid-core I', curved so as to suit its movable circle, and I construct a solenoid-helix, stationarily secured and curved in a form to suit the core I'. These helices are wound with a coil of very high resistance, so as to be capable of standing the total voltage of the work-circuit. The terminals of the helices are connected to the brushes of the generator G, as I here indicate in Fig. 4; but in practice they may be connected in linear series with the shunt-coil E².

K K are springs which are made strong enough to pull the brush-holder to a position suitable for the minimum load of the machine. These springs are therefore counter-springs, pulling against the solenoid-current. The current which flows through the solenoid-helices will vary directly proportional to the resistance of the work-circuit. Therefore the solenoid pull on the brush-holder will increase, so as to move the brushes in a position on the commutator suitable to all loads of the machine.

Solenoids have been used heretofore to move the brush-holder of a constant-current generator, but they have always been connected in series with the work-circuit, and therefore such a scheme is faulty, inasmuch as in a constant-current system there is too little variation in the volume of current to practically operate any device requiring to move the brush-holder.

I desire to call special attention to the fact that I do not move the brush-holder by the current of the work-circuit; but instead thereof I arrange the solenoid-helices in multiple arc with translating devices arranged in linear series with each other. This is an important distinction.

I do not wish to limit myself to the particular form of solenoid I illustrate in Fig. 4, for a modified form of solenoid or even an electromagnet might be used.

The spirit of this feature of my invention lies in connecting the device in a short circuit of a constant-current system; but of course there are new features in the specific device I show in Fig. 4. The circuits of the solenoids and work-circuit are shown to terminate in the brushes in this latter figure, and each of said circuits is indicated by arrow-heads located on each circuit. The full arrows indicate the direction of rotation of the armature suitable for the arrangement of the solenoids, as shown in Fig. 4. In a high-potential constant-current system used for arc-lighting the resistance of the work-circuit seldom changes less than five ohms at one time, and such changes should be counterbalanced by a corresponding change in the field magnetism. Otherwise either the translating devices or generator will become defective in action or else injured. Now from the fact that changing the magnetism of the field-magnets will set up a counter electromotive force, due to the discharge of the field-magnet cores, provision should be made for the escape of the induced current. Otherwise the induced current will oppose the flow of current through the fields or else be induced into the armature-windings and therefore cause a burn-out. Metallic cylinders have been used heretofore for such discharges; but they are sometimes expensive and troublesome to apply to magnets and controlling devices. Therefore I have devised the construction I show in Fig. 5. My scheme is carried out by winding a layer of insulated wire over the core of a magnet and then securing the ends of the wire to the core. In this way the core becomes part of the conductor for the flow of current, which I illustrate by the long arrow and the arrowheads in Fig. 5. Of course two layers of wire could be wound on the magnet-core instead of one, and in such a case the ends might be joined together, so as to form a closed circuit, the two ends of the wire being at the same end of the magnet; but to do so implies extra expense and labor. I propose constructing both the field-magnets and solenoid-helices in this way, so that they may respond instantaneously without being retarded by an opposing force.

Having thus explained the nature and merits of my invention, in accordance therewith I embody that which I consider to be new in the following claims:

1. In a system of constant-current generation and regulation, the combination of two electrical generators with a work-circuit, each of said generators having two sets of field-magnet coils; one field-coil of each generator, and the work-circuit, being connected in linear series with each other, one field-coil of one generator being arranged in multiple arc with the work-circuit, and the remaining field-coil being supplied with current from the other generator, substantially as described.

2. In a system of constant-current generation and regulation, the combination of two electrical generators with a work-circuit, each of said generators having two sets of field-coils; three of said sets of coils being supplied with current from one of said generators and the remaining set of coils being supplied with current from the other generator; the currents of electricity which flow through the two sets of field-coils of each generator, acting in a differential manner to each other, substantially as described.

3. In combination, a work-circuit having its translating devices arranged in linear series with each other; two electric generators, each being provided with two sets of field-coils, one of said sets of field-coils being connected in multiple arc with said work-circuit, only one of said generators supplying said work-circuit with a current of constant volume; means provided for causing the said multiple-arc field-coil to increase the potential of the work-circuit current proportional as translating devices increase the resistance of said work-circuit, substantially as described.

4. In a system of constant-current generation and regulation, the combination of two electric generators with a work-circuit, one of said generators supplying current for said work-circuit, and the other generator being used as a regulator for the work-circuit, and being in electrical circuit therewith; the work-circuit generator being provided with two sets of field-magnet windings, each traversed by currents of opposite direction, substantially as described.

5. In a system of constant-current generation and regulation, the combination with an electrical work-circuit, of two sources of electricity, and a shunt-circuit having a coil $E^2$ arranged therein, one of said sources of electricity supplying said work-circuit and also said shunt-circuit, the current which flows through said work-circuit being caused to suitably lower the potential of its source of supply, and the current of said second source, together with the current which flows through said shunt-circuit, being caused to suitably raise the potential of said first-named source of supply proportional to the resistance of said work-circuit, substantially as described.

6. In a system of constant-current generation and regulation, the combination with a work-circuit having its translating devices arranged in linear series with each other, of the generators G and G', each of said generators being provided with field-magnet coils, the generator G' supplying two sets of field-coils, one of said sets being wound upon its own magnet-cores and the other set being wound upon the magnet-cores of the other generator, said two sets of field-coils being connected in multiple arc with each other; a third set of field-magnet coils being connected in multiple arc with the work-circuit, a resistance H being arranged therein, substantially as described.

7. In a system of constant-current generation and regulation, the combination of a work-circuit having translating devices arranged therein in linear series, a movable brush-holder having attached thereto two solenoid magnet-cores, two stationarily-secured magnet-helices operating upon said magnet-cores to move the brush-holder in one direction, the windings of said helices being arranged in multiple arc with said work-circuit, substantially as described.

8. In a system of constant-current generation and regulation, the combination of a work-circuit having translating devices arranged therein in linear series, and a movable brush-holder provided with magnetic means for moving the brush-holder in one direction, said "magnetic means" including coils of wire, the same being connected in multiple arc with said work-circuit, substantially as described.

9. In a system of electrical generation and regulation, the combination of an electric generator provided with field-magnets, and a discharge-coil L coiled upon said magnets, the ends of the coil being electrically joined to the core upon which said coil is wound, having the core thus form a part of the electrical circuit, through which the discharge takes place, substantially as described.

10. In a system of constant-current generation, the combination with an electrical work-circuit, of a shunt-circuit, two sources of electricity, one of said sources supplying said work-circuit and also said shunt-circuit, the current which flows from the other source of supply, together with the current which flows through said shunt-circuit being caused to raise the potential of the current supplying the work-circuit proportional to the resistance of said work-circuit, while the current which flows through said work-circuit is caused to lower the potential of its source of supply suitably for maintaining a current of constant volume in said work-circuit, substantially as described.

In testimony whereof I sign this specification in the presence of two witnesses.

THOMAS H. HICKS.

Witnesses:
O. B. BAENZIGER,
MARY A. MARTIN.